(12) United States Patent
LaRue

(10) Patent No.: US 7,780,085 B2
(45) Date of Patent: Aug. 24, 2010

(54) ROUND SURFACE SCANNER

(76) Inventor: John D. LaRue, 6720 Golf Dr., Dallas, TX (US) 75205

( * ) Notice: Subject to any disclaimer, the term of this patent is extended or adjusted under 35 U.S.C. 154(b) by 1168 days.

(21) Appl. No.: 11/298,928

(22) Filed: Dec. 9, 2005

(65) Prior Publication Data

US 2007/0262145 A1 Nov. 15, 2007

(51) Int. Cl.
*G06K 7/10* (2006.01)

(52) U.S. Cl. ............. 235/462.14; 235/454; 235/462.01; 235/462.43

(58) Field of Classification Search ................. 235/454, 235/462.01, 462.14, 435, 439, 462.43
See application file for complete search history.

(56) References Cited

U.S. PATENT DOCUMENTS

| | | | | |
|---|---|---|---|---|
| 5,405,015 | A * | 4/1995 | Bhatia et al. ................. | 209/524 |
| 5,650,864 | A | 7/1997 | Tseng et al. | |
| 6,006,995 | A * | 12/1999 | Amundsen et al. ...... | 235/462.32 |
| 6,028,302 | A * | 2/2000 | Wiejak et al. ........... | 250/223 B |
| 6,054,707 | A | 4/2000 | Hou | |
| 6,111,244 | A | 8/2000 | Wang | |
| 6,137,900 | A | 10/2000 | Steidel et al. | |
| 6,206,534 | B1 | 3/2001 | Jenkins et al. | |
| 6,459,506 | B1 | 10/2002 | Hu et al. | |
| 6,512,221 | B2 | 1/2003 | Yen et al. | |
| 6,611,617 | B1 | 8/2003 | Crampton | |
| 6,962,291 | B2 * | 11/2005 | Guntveit et al. ......... | 235/462.14 |
| 7,106,898 | B2 * | 9/2006 | Bouguet et al. ............. | 382/154 |
| 7,490,773 | B2 * | 2/2009 | McVicker .............. | 235/462.24 |

OTHER PUBLICATIONS

White Paper of CIPA DC-001-2003, Digital Photo Solutions for Imaging Devices, Feb. 3, 2003, Camera & Imaging Productions Association.
A Flexible Scanner for Your Phone, mhtml:file:// W:\CLient%20Files\LARUE\LARUE-11 \From%20Inventor\Partnes%20and . . . .
Silicon Photodiodes Physics and Technology, UDT Sensors, Inc., APP Note, No. 02 Apr. 1982.
Organic Sheet-Image Scanner, 2002 IEE International Electron Devices Meeting.

* cited by examiner

*Primary Examiner*—Thien M. Le
*Assistant Examiner*—April A Taylor
(74) *Attorney, Agent, or Firm*—Robert Groover; Malcolm W. Pipes; Groover & Associates

(57) ABSTRACT

A scanner capable of scanning a curved surface such as a bottle or other cylindrical, or curved surfaced object. In one class of embodiments, the present innovations include a scan head and one or more rollers (preferably two rollers, one active, the other passive) on which a cylindrical object turns in proximity to the head. As the object turns, the head records the image on the surface of the object.

24 Claims, 6 Drawing Sheets

ROUND SURFACE SCANNER

BACKGROUND AND SUMMARY OF THE INVENTION

The present application relates to optical scanners, and more particularly to an innovative scanner capable of scanning cylindrical objects or objects with curved surfaces.

Many applications involve the use of scanners to transfer physically embodied text or images (for example, from a scanned sheet of paper) into an electronic format. Most scanners include several components, such as a scan head, lamps to illuminate the scanned object, lenses to focus light within the device, a photosensitive element, such as a charge-coupled device (CCD) array or MOS photodiode array, to convert photons into electrical signals, and control circuitry. Together these components form the system that scans the surface of a piece of paper and transfers the information into an electronic format, such as a computer file. Photosensitive arrays are the most common means of image capture. A typical array is made up of many tiny photodiodes that are sensitive to light. Photons striking a photodiode are converted into electrical signals. The brighter the light that strikes the photodiode, the greater the electrical charge that will accumulate at that site.

Flatbed scanners are among the most versatile of existing scanners and are the most commonly used. They normally include a flat surface on which a page is placed to be scanned, while a scan head moves with respect to the page to capture text or images on the page. Sheet fed scanners are similar to flatbed scanners, except that the sheet moves and the scan head is stationary. Drum scanners are used in industries where high levels of detail are required. Most drum scanners use a photomultiplier tube. In these types of scanners, a document to be scanned is mounted on a glass cylinder. In the cylinder is a sensor that splits light bounced from the document into three beams. Each beam is sent through a color filter into a photomultiplier tube where the light is changed into an electrical signal.

These prior art varieties of scanners all have limitations. For example, the sheet fed scanner and drum scanner require a flexible material to scan, as their mechanism for accepting the object to be copied bends the object in the process of scanning, be it wrapping the object around a cylinder or feeding it through a scanner's system. Flatbed scanners can scan either flexible or rigid, planar (flat) objects.

None of these types of scanners are capable of scanning a rigid, non-planar object or surface. Therefore, the state of the art would be improved by a system or method to scan a rigid cylindrical, or other non-flat shaped object.

Round Surface Scanner

In one example embodiment, the present innovations are described as a scanner capable of scanning a curved surface such as a bottle or other cylindrical, or curved surfaced object. In one class of embodiments, the present innovations include a scan head and one or more rollers (preferably two rollers, one active, the other passive) on which a cylindrical object turns in proximity to the head. As the object turns, the head records the image on the surface of the object.

The disclosed innovations, in various embodiments, provide one or more of at least the following advantages: curved solid objects, such as a cylindrically shaped object, can be scanned quickly and easily.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment (by way of example, and not of limitation).

Figure 1:
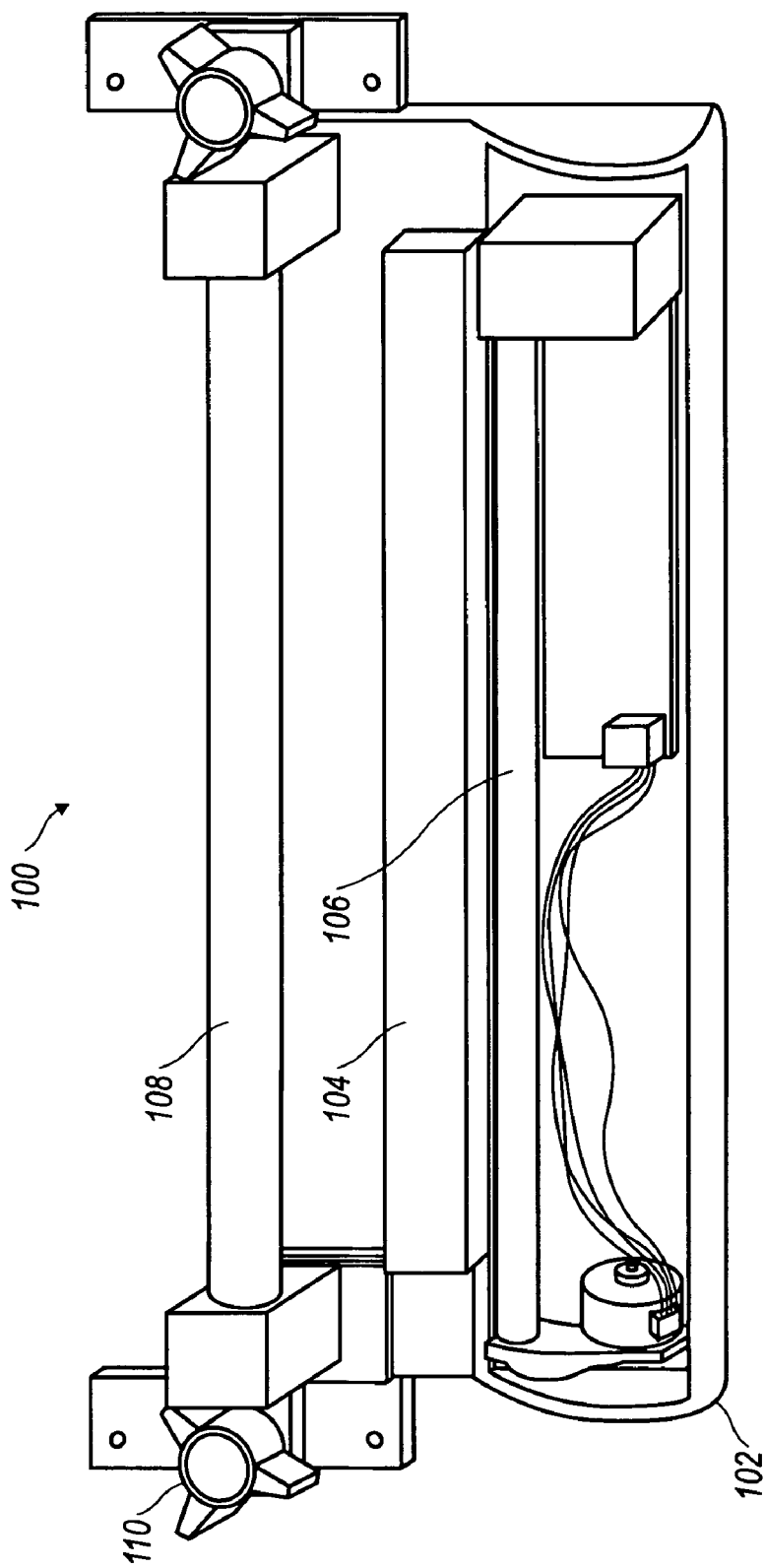
FIG. 1 shows an overview diagram of an example consistent with a preferred embodiment of the present innovations.

FIG. 1 shows one illustrative embodiment consistent with the present innovations. In this example, scanner 100 is shown with a base 102 that contains electronics capable of operating the various elements of the scanner, whether self-contained or connected to a separate computer system (not shown). Scan head 104 is positioned between and parallel with two rollers 106, 108 which are placed in proximity so that an object (such as a bottle, not shown) can rest on rollers 106, 108 and rotate while scan head 104 scans the object's surface. In a preferred embodiment, one roller (e.g., roller 106) is an active roller, while the other (e.g., roller 108) is passive. As an object turns on the rollers, scan head 104 scans the surface of the object. Scan head 104 is preferably mounted on springs (not shown) so that it is placed against or very near to the object's surface. In preferred embodiments, scan head 104 has as large a depth of field as possible, so that objects can be scanned even when not pressed directly against the scan head. It is noted that many flatbed scanners have a good depth of field, such as ⅜ of an inch, because they incorporate true optics. Though it would be possible to use a flatbed optical train for the curved surface scanner of the present innovations, this would increase the bulk and cost significantly.

Positions of the rollers 106, 108, are preferably adjustable, for example, by position controls 110. In some embodiments, the positions of one or both rollers are dynamically adjustable, as in the case of a non-cylindrical (i.e., elliptical) object, which would (in some embodiments) require adjustment during scanning. In some embodiments, at least one of the rollers has a soft exterior, such as a rubberized exterior, which reduces vibrations between the object being scanned and the scan head as the object turns on the rollers. Some embodiments also include smooth (such as Teflon) coatings, or even non-rotating Teflon objects, in place of the passive roller, provided the coefficient of friction can be reduced to a small enough value to allow smooth scanning. In other embodiments, rollers can be replaced by wheels that are positioned so as to hold the object in place, rather than the length-wise continuous support provided by the rollers as shown.

The type of scanner bar implemented in preferred embodiments includes a means of both illuminating the object and capturing the scanned image. Light reflected from the object can be, for example, collected via a 20D SELFOC 1:1 Lens Array (though of course other implementations are possible). Individual lenses in such an array are 0.56 mm in diameter and have a specified depth of field of only 0.30 mm or so. Lens arrays with longer focal length are available but not generally necessary since usage has shown that the useful focal length is several times the advertised value. These examples are intended only to be illustrative, and are not intended to limit the scope or application of the present innovations.

Figure 2:
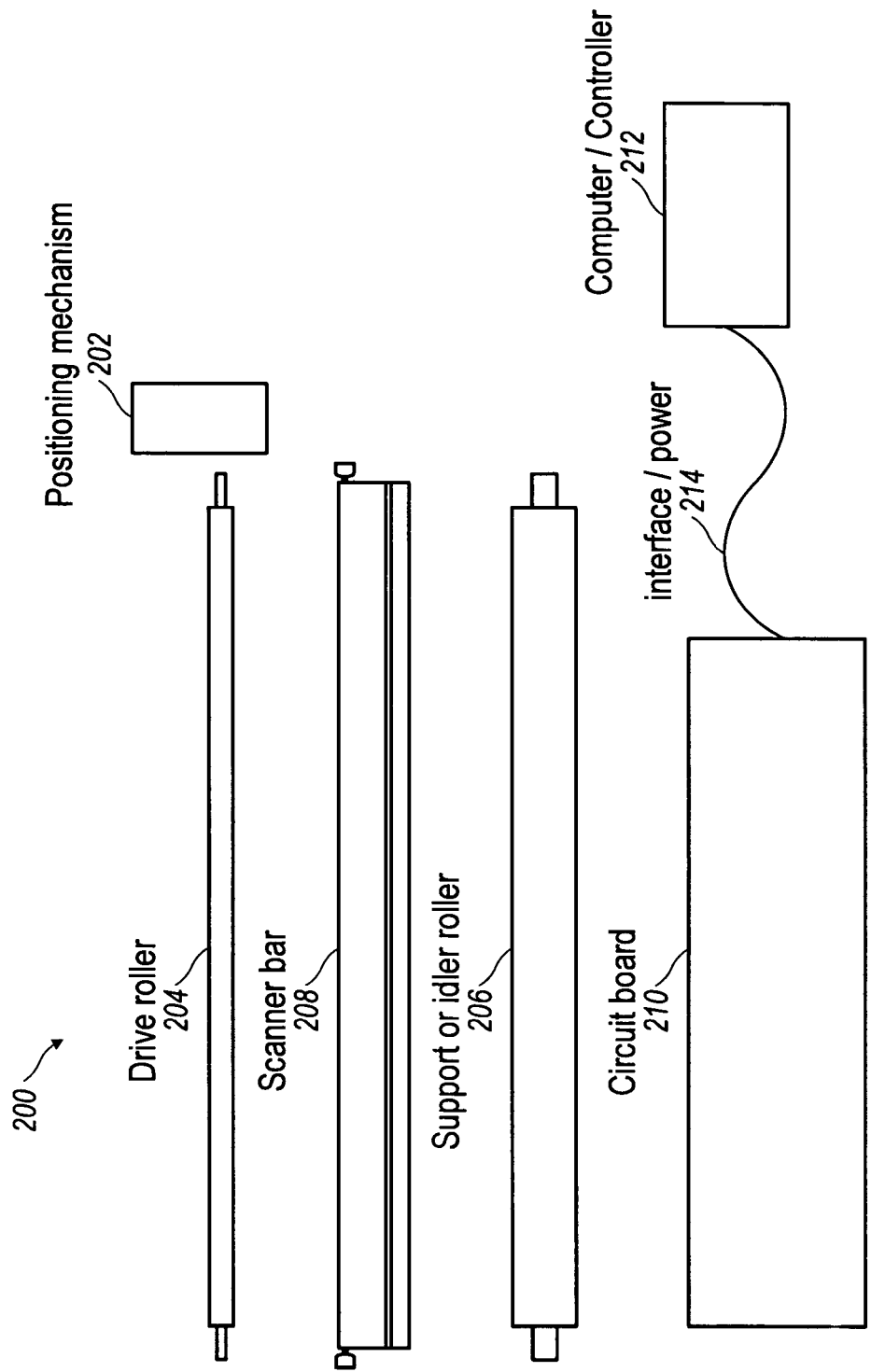
FIG. 2 shows a set of elements consistent with implementing a preferred embodiment of the present innovations.

FIG. 2 shows a diagram of elements that are included in a preferred embodiment of the present innovations. In this example embodiment, a positioning mechanism 202 adjusts where a roller is positioned. For example, the positioning mechanism 202 can be operably attached to adjust the position of either drive (active) roller 204 or support (passive) roller 206. Rollers 204, 206 are preferably positioned near scan bar 208 (which preferably includes sensor elements such as CCD or MOS photosensitive elements) in order to support a cylindrical (or other curved surfaced object) near the scan bar 208. Objects are preferably held within the depth of field of the scan bar 208. Positioning mechanism 202 preferably can be adjusted to hold objects of varying sizes. For example, if positioning mechanism 202 is in a first position, rollers 204, 206 will be close together, such that a narrow or small object can be held. Or, if positioning mechanism 202 is in a second position, rollers 204, 206 will be farther apart, suitable for holding a larger object. Positioning mechanism 202 is preferably continuously adjustable, so that a range of objects can be held. Positioning mechanism 202 can also be dynamically adjustable so that a non-cylindrical object, such as an ellipsoidal object, can be scanned, while maintaining the object within the depth of field of the scan bar 208. In this example embodiment, the positioning mechanism 202 preferably adjusts so as to keep the scanned object in close proximity to the scan bar 208. In preferred embodiments, circuit board 210 includes control circuitry that controls the actions of the scanning system 200. Circuit board 210 is preferably attached via an interface 214 with a computer system or controller 212 that can also control the system and/or receive and store images scanned.

Figure 3:
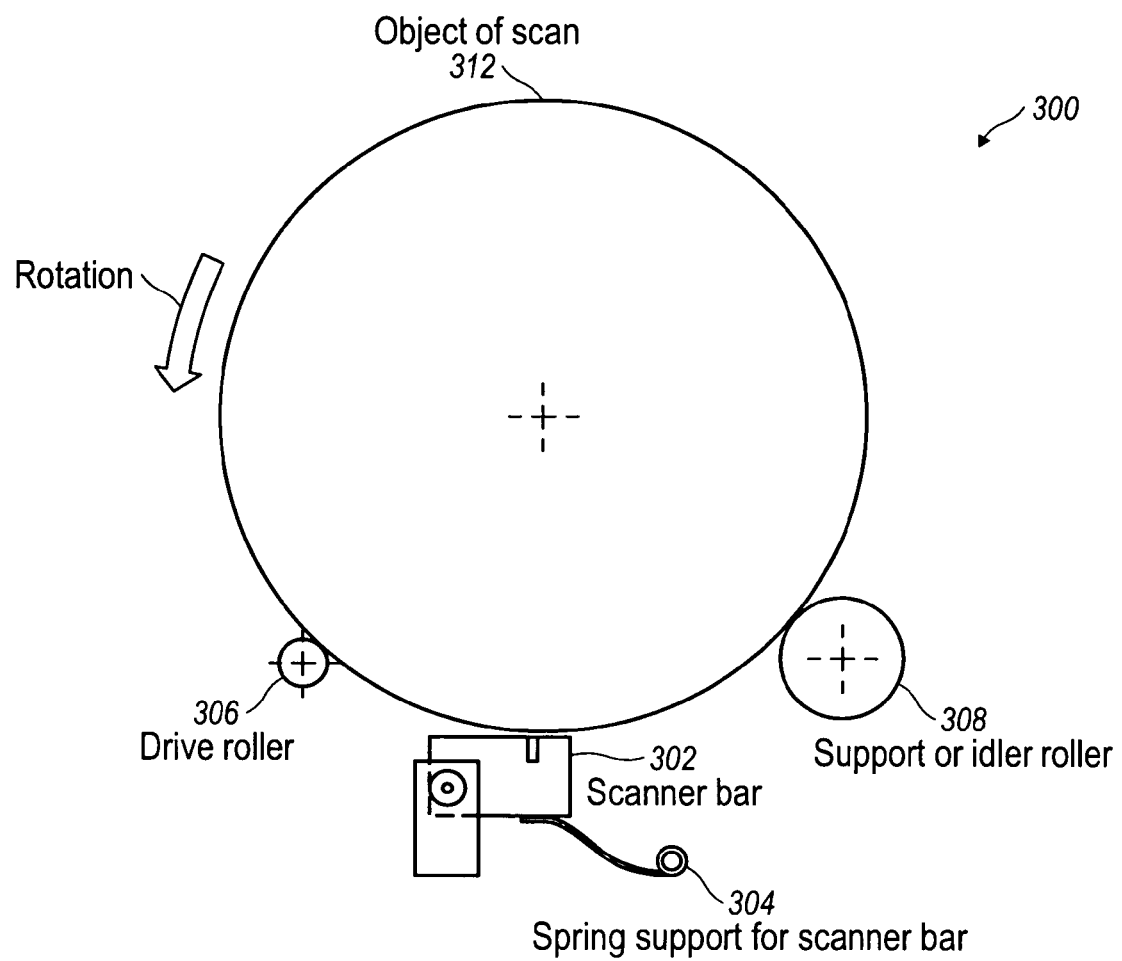
FIG. 3 shows a side view of an example embodiment consistent with a preferred embodiment of the present innovations.

FIG. 3 shows another example consistent with a preferred embodiment of the present innovations. In this system 300, scanner bar 302 is supported by spring support 304 which holds scanner bar 302 in proximity to object 312 which is being scanned. Object 312 is supported by drive roller 306 and idle roller 308 which are positioned according to the diameter of the object 312 so the surface of the object is held in proximity to the scanner bar 302 and within the depth of field of the scanner bar's scanning elements. Drive roller 306 is preferably driven by a motor that rotates, causing the object 312 to rotate so that its surface passes by scanner bar 302. Scanner bar 302 records the surface of the object 312 producing a scan of the surface. Idle roller 308 is preferably not driven, and simply rotates freely. Drive roller 306 is preferably coated with a rubber substance or other surface that is capable of gripping the surface of the object 312 so that as the drive roller 306 turns, the object 312 also turns. This example shows the rotation of the object, which can be important in some embodiments.

Figure 4:
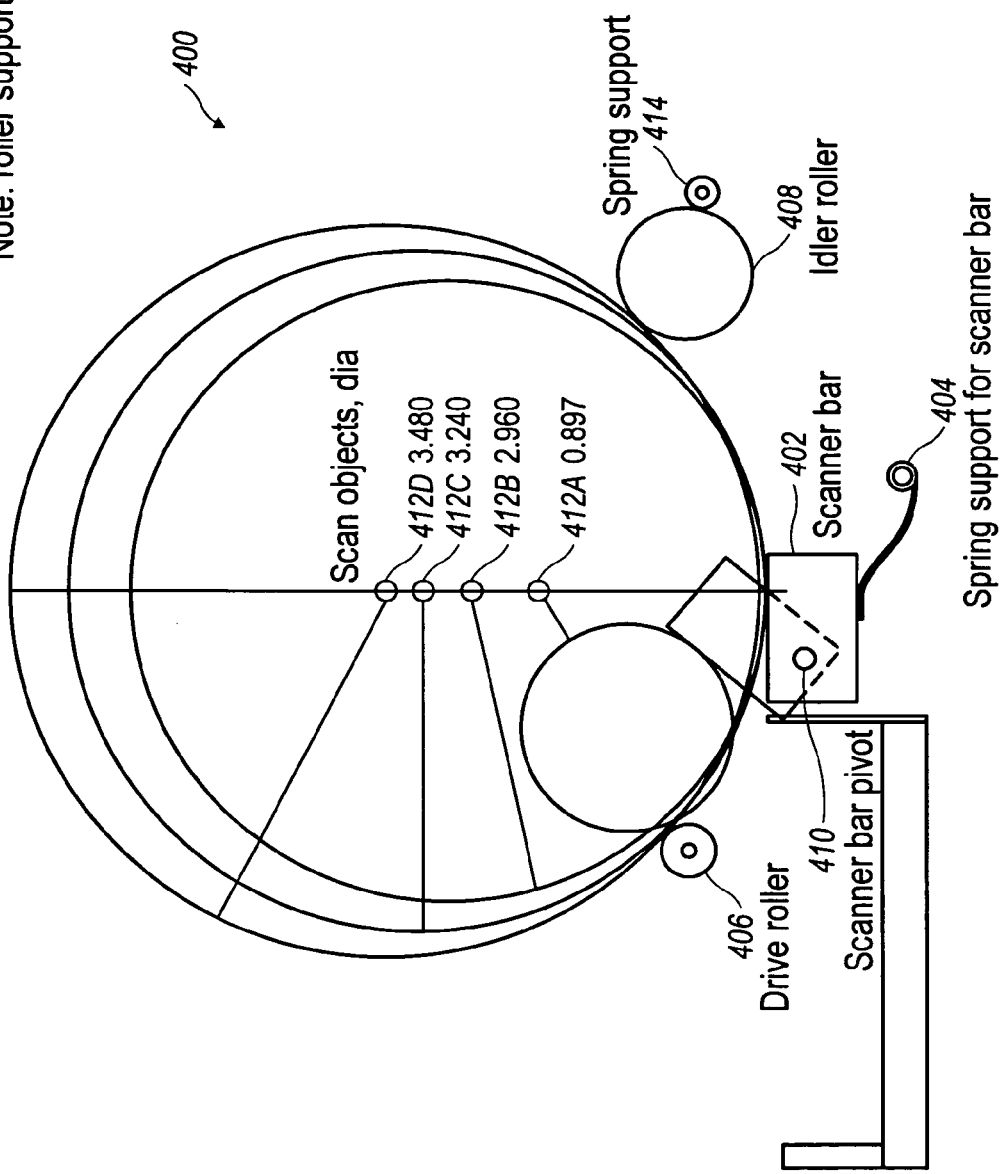
FIG. 4 shows a side view of an example embodiment consistent with a preferred embodiment of the present innovations.

FIG. 4 shows another example consistent with a preferred embodiment of the present innovations. In this scanner system 400, scanner bar 402 is supported by a spring support 404 that helps the scanner bar 402 pivot around a scanner bar pivot 410. This action allows the scanner bar 402 to remain close to or in contact with scanned objects of varying diameter, or a single scanned object of varying diameter such as an ellipsoidal object. In this example, several objects 412A-412D are shown between drive roller 406 and idle roller 408. As smaller objects are placed in the system, rollers 406, 408 are closer together. The smallest object 412A is too small to span the distance between rollers 406, 408 so that scanner bar 402 must serve as one of the supports instead of idle roller 408. This is accomplished by means of the scanner pivot bar 410 and sprint support 404, which move the scanner bar 402 closer to the object 412A. Likewise, if a non-cylindrical object is placed in the system, it effectively has varying diameters, depending on the object's orientation at a given point in time. Using spring support for scanner 404 and spring support for the idle roller 414, the object's surface is kept in proximity to the scanner bar 402 as it turns. For example, at a first point in time, a non-cylindrical object can have a diameter 412B, and it is supported by drive roller 406 and idle roller 408. As the object turns, its diameter slowly changes to that of 412A. As this occurs, spring support 414 moves idle roller 408 closer to drive roller 406 to continue support of the object. When the object's radius is effectively too small (such as diameter 412A), scanner bar 402 replaces idle roller 408 as a support by action of the spring support for scanner 404 and scanner bar pivot 410. This process reverses as the non-cylindrical object's diameter effectively increases as it turns. In this way, the surface of a non-cylindrical object is kept in proximity to scanner bar 402.

Implementation of a dynamically adjustable support system and positioning mechanism can be done in a number of ways. For example, a sensor can be positioned beneath the object to be scanned, to detect when the object moves too low. The object moving too low would indicate that the object was beginning to slip between the support rollers (for example), and the rollers should be moved closer together to maintain support. In another implementation, the scan head can be mounted on a pivot with a spring holding it up against the object. If the object began to slip between the support rollers (as its rotation brought its narrower diameter between the rollers), this would put more weight on the scan head, forcing it to pivot downward. This downward motion would cause the scan head to turn on its pivot. This pivoting could be detected and would signal that the support rollers need to be moved closer together. Likewise, if the object were to rotate so a wider profile were presented between the rollers, the scan head would pivot upward (by action of the spring beneath it and an absence of the object's surface pressing downward). This could signal the adjustable positioning mechanism to automatically widen the positions of the rollers, so that the object again stayed in proximity to the scan head.

Heavier objects (such as full wine bottles) might limit the application of too many springs or spring controlled variables, as large differences in weight would likely require large differences in spring constants. Depending on the springs chosen, a given implementation may be suitable for heavy, or light, objects, but not both. This problem could be alleviated by including adjustable-constant springs, or replacement springs with higher or lower spring constants, as needed, depending on the weight of the object being scanned.

Figure 5:
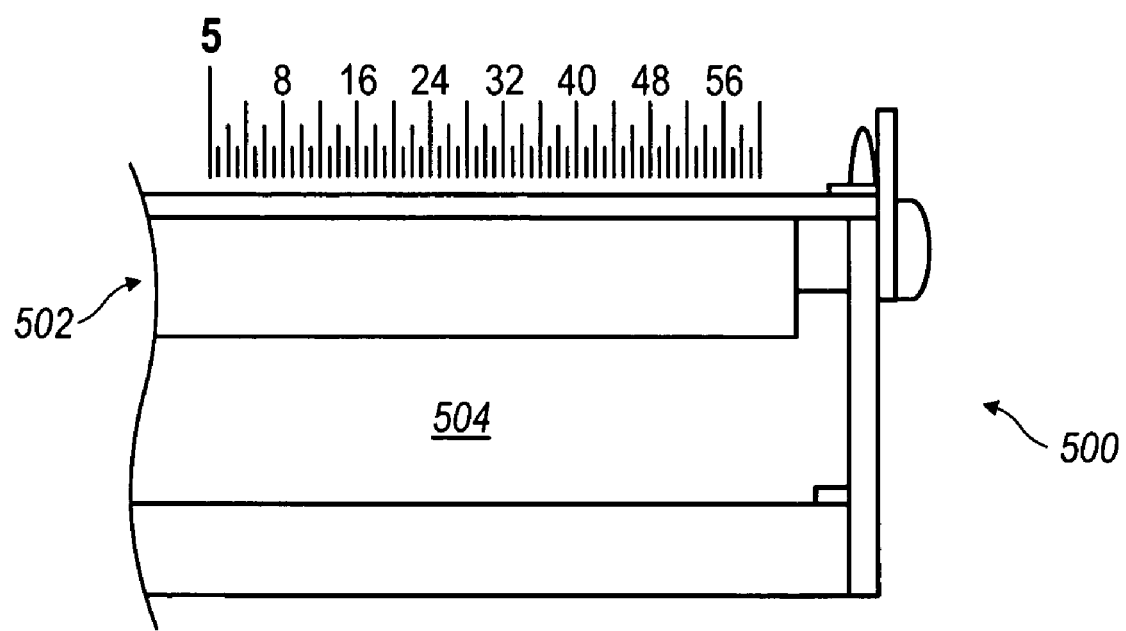
FIG. 5 shows a view of a scan head and sensor array consistent with a preferred embodiment of the present innovations.

FIG. 5 shows an enlarge image of a scan head consistent with an embodiment of the present innovations. This image shows the example scan head 500 and the array of lenses 502. These small holes are actually lenses that project a series of overlapping images onto photosensors (not shown) located on a printed circuit board. Region 504 houses, for example, LEDs that illuminate the object being scanned. The face of this example scanner is covered and sealed by a thin piece of glass.

In preferred embodiments, the sensors are positioned anywhere along the periphery of the object being scanned while it is convenient to mount the array beneath the object (which allows objects of widely varying sizes to be scanned), the array can also be mounted above the scanned object, for example, on a movable arm or bracket. In such an embodiment, the weight of the scanner can hold the scanner against the object. In other embodiments, a counter balance can be added to suspend the array just in contact with the object, though this embodiment is less preferred.

Figure 6:
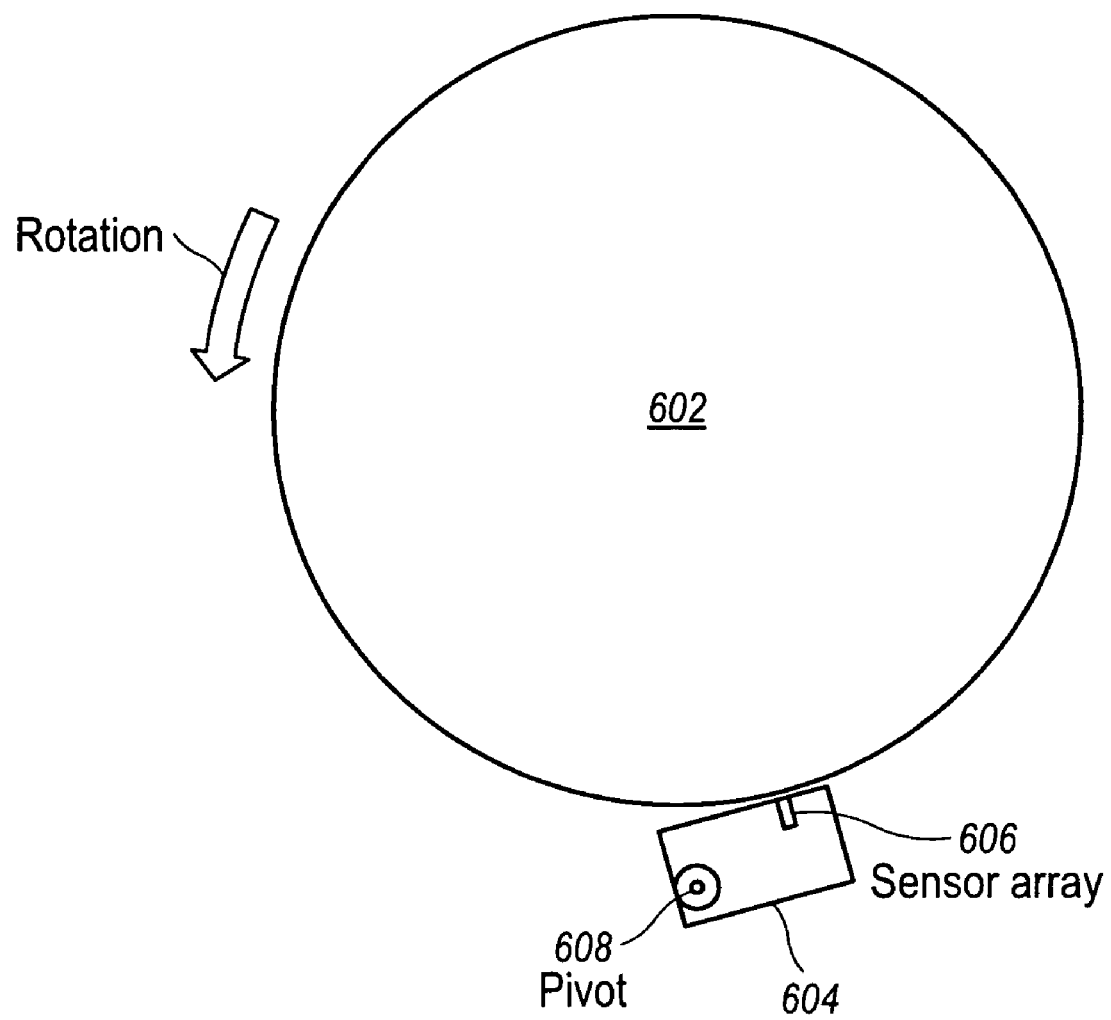
FIG. 6 shows another example embodiment, consistent with the present innovations.

In some embodiments, particularly those in which the scan head itself is part of the support system for the object being scanned, it is advantageous for the sensor array bar to be positioned at slightly more than a 90 degree tilt relative to the object being scanned, as illustrated in FIG. 6. In this example, object 602 is supported (in part) by the scan bar 604 near the sensor array 606 and preferably one other roller (not shown; see, for example, FIG. 3 or FIG. 4). In this example, scan bar 604 is supported by pivot 608. In this way, the sensor array 606 is brought in close proximity to the object being scanned 602, and any roughness (such as peeling labels on a wine bottle, for example) will not get hung on the edge of the scanner bar. Of course, in this example, direction of rotation would be important and would be considered in determining the angle of tilt of the scan bar.

According to a disclosed class of innovative embodiments, there is provided: A method of scanning an object, comprising the steps of: rotating the object, while; imaging the object with a stationary scan head.

According to a disclosed class of innovative embodiments, there is provided: A scanning device, comprising: a scan head; first and second rollers; wherein the first and second rollers are positioned such that an object placed on the first and second rollers is within the depth of field of the scan head.

According to a disclosed class of innovative embodiments, there is provided: A scanning device, comprising: a scan head; a first roller; wherein the first roller causes an object to rotate in proximity to the scan head.

According to a disclosed class of innovative embodiments, there is provided: A scanning device, comprising: a scan head; a support structure for supporting and rotating an object with a curved surface; a spring positioned to support the scan head; wherein the object rotates in proximity to the scan head, and the scan head scans the curved surface of the object.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

For example, the rollers as depicted herein are illustrative only, and could be replaced by other types of rollers or mechanisms that can cause an object to rotate such that the surface of a curved object is presented in proximity to a scan head. For example, one or more wheels, belts, or other props, properly placed, could serve as rollers within the context of the present innovations.

For another example, any type of scanning head could be used, whether a CCD or MOS photosensitive element or other type of scanning elements. The sensor array used can be of any type, including but not limited to fan-out arrays (which implement separate optics to capture the image) or full-length arrays. Various kinds of LEDS can be used where applicable.

The present innovations can also be implemented as part of a computer system, or can be attached to a computer system, where the scanned data can be transferred and stored, displayed, manipulated and/or transmitted. The present innovations can be implemented in conjunction with, or designed to be attached to, other devices, such as an interface and a printer, for example, for viewing, cropping, manipulating, printing, storing, or otherwise using the captured images.

Additional general background, which helps to show variations and implementations, may be found in the following publications, all of which are hereby incorporated by reference: White Paper of CIPA DC-001-2003, Digital Photo Solutions for Imaging Devices, Feb. 3, 2003, Camera & Imaging Products Association.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

The claims as filed are intended to be as comprehensive as possible, and NO subject matter is intentionally relinquished, dedicated, or abandoned.

What is claimed is:

1. A method of image scanning an object, comprising the steps of:
    rotating a curved object longitudinally supported and rotated by at least one longitudinally and parallel positioned roller, said roller positioned parallel with at least one stationary image scan head, with the object kept within an optimal distance of the image scan head using a spring support mechanism, while;
    capturing an image on the object with the at least one stationary image scan head.

2. The method of claim 1, wherein the imaging step comprises scanning successive stripes of the object as the object rotates.

3. The method of claim 1, wherein the object has at least a partly curved surface.

4. The method of claim 1, wherein the object is not round but has a partially curved surface.

5. The method of claim 1, wherein the step of imaging is implemented in a spring mounted scan head used to ensure positioning the scan head within its optical depth of field relative to the object.

6. The method of claim 1, wherein the object is a wine bottle.

7. A scanning device, comprising:
    at least one scan head;
    first and second rollers positioned parallel to the at least one scan head to support a curved surface object longitudinally and parallel with the first and second rollers, the rollers supporting and rotating objects during scanning using at least one active rotating roller;
    wherein the first and second rollers are positioned such that an object placed on the first and second rollers is rotated within the depth of field of the scan head, the scan head position maintained relative to the object using a spring support mechanism.

8. The device of claim 7, wherein the first roller rotates such that an object placed on the first and second rollers rotates in proximity to the scan head.

9. The device of claim 7, wherein the first roller rotates at a rate associated with a scan rate of the scan head.

10. The device of claim 7, wherein the second roller has a padded surface.

11. The device of claim 7, further comprising a positioning mechanism that adjusts the distance between the first roller and the second roller.

12. The device of claim 7, wherein the object is a wine bottle.

13. A scanning device, comprising:
 a scan head able to capture an image from an object and positioned for optical scanning by a spring support mechanism;
 a first roller positioned parallel to the scan head to support a curved object and position an image on said object for the scan head to capture;
 wherein the first roller rotates and causes the object to rotate in proximity to the scan head at a speed corresponding to a rate of image capture of the scan head.

14. The device of claim 13, further comprising a second roller in parallel proximity to the first roller such that an object placed between the first roller and second roller is in proximity to the scan head and kept within the depth of field of the scan head.

15. The device of claim 14, further comprising a spring support positioned to support the second roller such that a non-cylindrical object's surface is held within a depth of field of the scan head as the non-cylindrical object rotates.

16. The device of claim 13, further comprising a spring positioned to support the scan head such that the first roller and the scan head support the object as it rotates in proximity to the scan head.

17. The device of claim 13, further comprising a positioning mechanism that adjusts the distance between the first roller and a parallel second roller.

18. The device of claim 13, wherein the object is a wine bottle.

19. A scanning device, comprising:
 a scan head to copy an image on a curved object;
 a support structure comprising a drive roller and a parallel second roller, the two rollers longitudinally positioned for supporting and rotating an object with a curved surface positioned on and between the two rollers;
 a spring positioned to support the scan head;
 wherein the object rotates in proximity to the scan head, and the scan head scans an image on the curved surface of the object.

20. The device of claim 19, further comprising a spring support positioned to support the second roller such that as a non-cylindrical object rotates, the second roller can dynamically adjust positions to maintain the non-cylindrical object in close proximity to the scan head.

21. The device of claim 19, further comprising a positioning mechanism that adjusts the distance between the drive roller and the second roller.

22. The device of claim 19, wherein the support structure and the scan head support the object.

23. The device of claim 19, wherein the support structure comprises a drive roller that rotates, causing the object to rotate.

24. The device of claim 19, wherein the object is a wine bottle.

* * * * *